(12) United States Patent
Balasubramanian et al.

(10) Patent No.: US 7,301,883 B1
(45) Date of Patent: Nov. 27, 2007

(54) ADVANCED HIGH DENSITY DATA WRITE STRATEGY

(75) Inventors: Kunjithapatham Balasubramanian, Orlando, FL (US); Hans Henry Hieslmair, Oakland, CA (US); Raghuram Narayan, Fremont, CA (US); Judith C. Powelson, Alameda, CA (US); Jason M. Stinebaugh, Berkeley, CA (US); David K. Warland, Davis, CA (US); Ting Zhou, Alameda, CA (US)

(73) Assignee: LSI Corporation, Milpitas, CA (US)

( * ) Notice: Subject to any disclaimer, the term of this patent is extended or adjusted under 35 U.S.C. 154(b) by 703 days.

(21) Appl. No.: 10/171,394

(22) Filed: Jun. 12, 2002

(51) Int. Cl.
*G11B 7/00* (2006.01)

(52) U.S. Cl. .............. 369/116; 369/47.51; 369/59.11; 369/59.12

(58) Field of Classification Search .................. None
See application file for complete search history.

(56) References Cited

U.S. PATENT DOCUMENTS

| | | | |
|---|---|---|---|
| 5,121,376 A | 6/1992 | Kuder et al. | 369/100 |
| 5,136,573 A | 8/1992 | Kobayashi | 369/116 |
| 5,144,615 A | 9/1992 | Kobayashi | 369/116 |
| 5,253,198 A | 10/1993 | Birge et al. | 365/106 |
| 5,258,969 A | 11/1993 | Refregier et al. | 369/100 |
| 5,351,617 A | 10/1994 | Williams et al. | 101/467 |
| 5,385,092 A | 1/1995 | Lewis et al. | 101/467 |
| 5,428,599 A | 6/1995 | Yashima et al. | 369/283 |
| 5,495,466 A | 2/1996 | Dohmeier et al. | 369/275.4 |
| 5,563,873 A | 10/1996 | Ito et al. | 369/286 |
| 5,627,816 A | 5/1997 | Ito et al. | 369/275.1 |
| 5,631,887 A | 5/1997 | Hurst, Jr. | 369/59 |
| 5,644,556 A | 7/1997 | Oikawa | 369/13 |
| 5,649,026 A | 7/1997 | Heins, III | 382/175 |
| 5,732,062 A * | 3/1998 | Yokoi et al. | 369/116 |
| 5,737,301 A | 4/1998 | Miyamoto et al. | 369/116 |
| 5,742,566 A * | 4/1998 | Imai | 369/116 |
| 5,748,598 A | 5/1998 | Swanson et al. | 369/94 |
| 5,757,763 A | 5/1998 | Green, Jr. et al. | 369/275.3 |
| 5,818,808 A * | 10/1998 | Takada et al. | 369/116 |
| 5,848,043 A * | 12/1998 | Takada et al. | 369/116 |

OTHER PUBLICATIONS

Uchino, et al, "High-Density Pulse Width Modulation Recording and Rewritable Capability in GeSbTe Phase-Change System Using Visible Laser Beam at Low Linear Velocity" Jpn Journal Applied Phys. vol. 32 (1993) p. 5354-5360, No. 11B, Nov. 1993.

Jacobs, et al, "Improved High-Density Phase Change Recording" Jpn Journal Appl. Phys. vol. 36 (1997) p. 491-494, No. 1B, Jan. 1997.

Parker, Dana J., "The Many Faces of High Density", Emedia Professional, Jan. 1998, pp. 60-71.

Ohno, Eiji, et al, "Multipulse Recording Method for Pulse-Width Modulation Recording on an Erasable Phase Change Optical Disk", Jpn. J. Appl. Phys., vol. 30, No. 4, Apr. 1991, pp. 677-681.

\* cited by examiner

*Primary Examiner*—William R. Korzuch
*Assistant Examiner*—Jorge L. Ortiz-Criado
(74) *Attorney, Agent, or Firm*—Christopher P. Maiorana PC

(57) ABSTRACT

A method of writing a mark to an optical disc includes receiving data to be written and generating a control signal for a laser pulse having a melt period that transitions to a growth period wherein the melt period is characterized by a melt power and the growth period is characterized by a growth power.

21 Claims, 10 Drawing Sheets

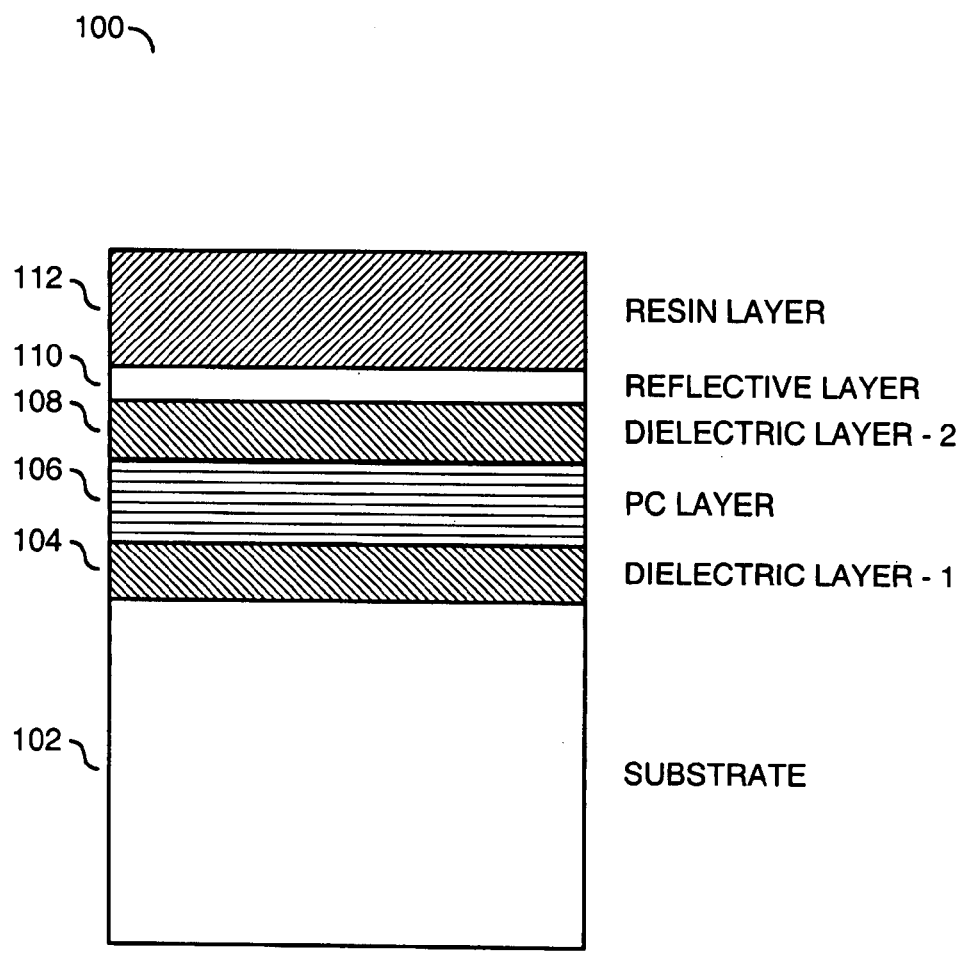
FIG. 1A
(CONVENTIONAL)

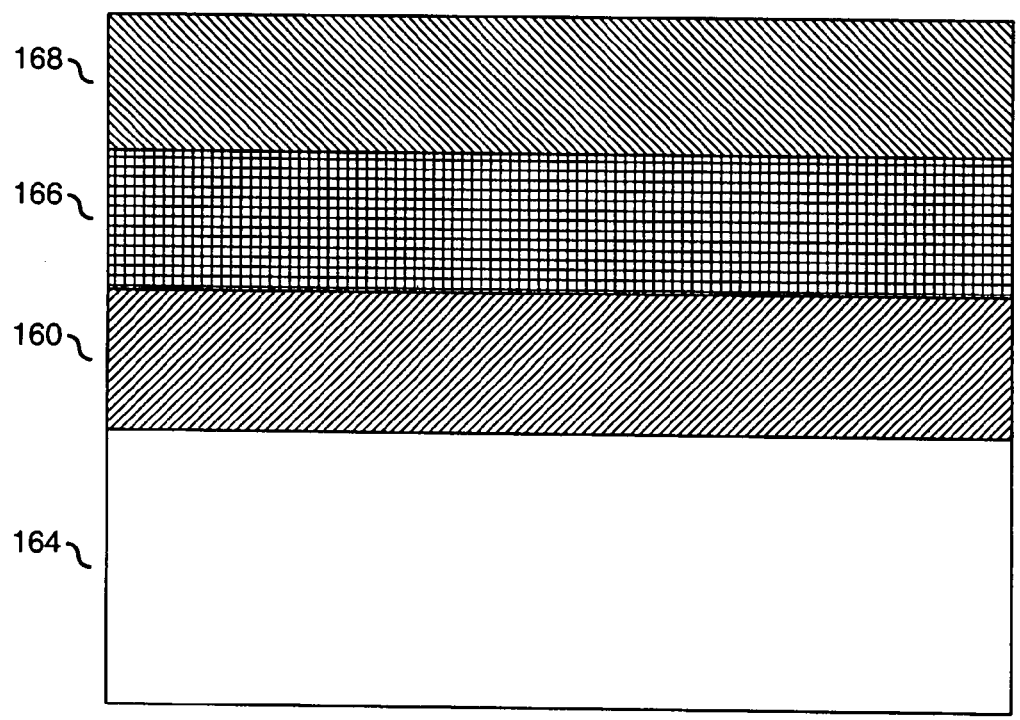
FIG. 1B
(CONVENTIONAL)

ADVANCED HIGH DENSITY DATA WRITE STRATEGY

CROSS REFERENCE TO RELATED APPLICATIONS

This application claims priority to U.S. patent application Ser. No. 09/373,916, entitled HIGH DENSITY DATA WRITE STRATEGY, filed Aug. 12, 1999, now U.S. Pat. No. 6,775,218, issued, which is incorporated herein by reference for all purposes; and U.S. patent application Ser. No. 09/879,858, entitled HIGH DENSITY DATA WRITE STRATEGY, filed Jun. 12, 2001, now abandoned, which is incorporated herein by reference for all purposes; and U.S. patent application Ser. No. 09/879,657, entitled HIGH DENSITY DATA WRITE STRATEGY, filed Jun. 12, 2001, now abandoned, which is incorporated herein by reference for all purposes.

FIELD OF THE INVENTION

The present invention relates generally to optical data storage. More specifically, write strategies for controlling the power of a writing laser are disclosed.

BACKGROUND OF THE INVENTION

U.S. Pat. No. 6,775,218, which was previously incorporated by reference, discloses various write strategies for writing data to an optical discs. Those write strategies precisely manipulate the state of regions of an optical disc to store data. To increase data density, it is desirable to develop more advanced write strategies that even more precisely control regions of an optical disc to store data.

Further, it is important to develop write strategies for a variety of types of optical discs, including phase change optical discs and dye based optical discs. Such optical discs can be configured as rewritable, write once read many, read only or in any other appropriate manner. In addition such discs may conform to various standards defined for disc size, type of reading laser and thickness. Such standards include the various defined DVD standards, CD standards, and newer standards such as the standards being developed for use with blue lasers. In each case, effective write strategies need to be developed for data densities to be maximized.

BRIEF DESCRIPTION OF THE DRAWINGS

The present invention will be readily understood by the following detailed description in conjunction with the accompanying drawings, wherein like reference numerals designate like structural elements, and in which:

FIG. 1A is a cross section of a typical optical phase change disc 100. Optical phase change disc 100 includes a substrate 102.

FIG. 1B illustrates an example of a typical dye-based CD-R type media.

FIG. 2I shows a write strategy used in a multilevel system that is physically compatible with a DVD-RAM system and media.

DETAILED DESCRIPTION

Figure 2A:
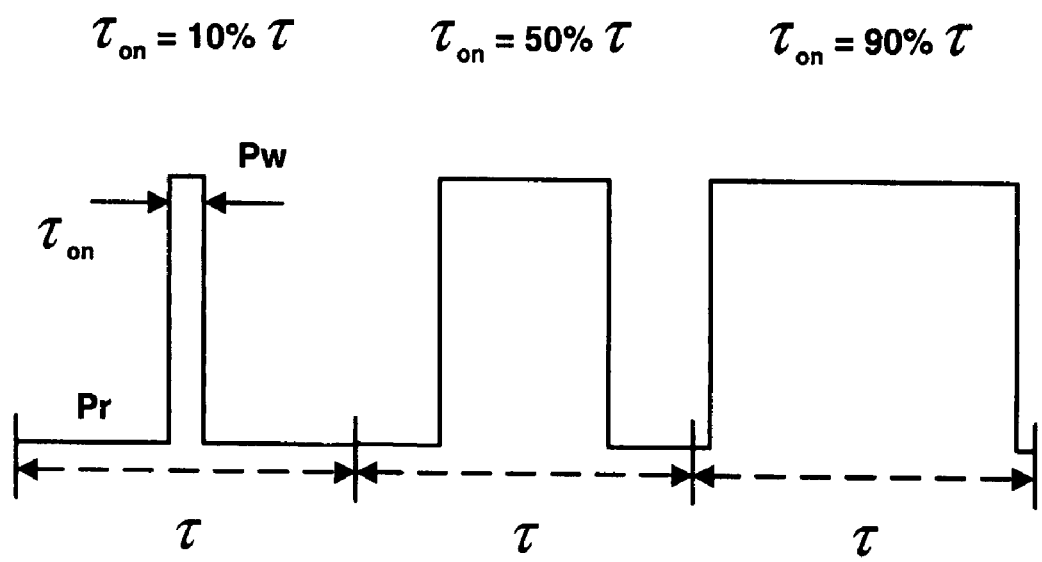
FIGS. 2A and 2B show other embodiments of pulse width modulated write strategies.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Information may be stored on an optical disc by creating regions or "marks" having a different reflectivity than the surrounding surface of the disc. In an optical phase change disc, such regions are formed by irradiating the surface of the disc with a writing laser that causes a region to be warmed and melted or partially melted. As the region cools, the region may change to a crystalline or amorphous state or some combination of crystalline and amorphous states. When a reading laser is incident on such a region, the reflected light can be measured and the state of the region can be determined. The state of the region represents stored data. Different levels of reflectivity may represent different data levels.

FIG. 1A is a cross section of a typical optical phase change disc 100. Optical phase change disc 100 includes a substrate 102. A first dielectric layer 104 is deposited on the substrate. A recording layer 106, which is composed of a phase change material, is deposited on top of dielectric layer 104. A second dielectric layer 108 is deposited over recording layer 106. A reflective layer 110 is deposited over dielectric layer 108. Finally, a protective resin layer 112 is deposited over reflective layer 110. The layers described above are provided as an example only and that the techniques described herein are applicable to other types of phase change discs as well as other optical discs that utilize different recording mechanisms. U.S. Pat. Nos. 5,136,573 and 5,144,615, (the '573 and '615 patents, respectively) issued to Kobayashi, which are herein incorporated by reference for all purposes, describe techniques for multilevel recording using optical phase change discs. Kobayashi describes lowering the reflectivity of an initially amorphous region by forming crystalline material and that more crystalline material may be formed as the writing laser power is increased. Kobayashi also discloses an overwrite technique that forms a crystalline region using a low level biasing energy and increases the reflectivity by forming a crystalline region at certain spots using energy pulses that create amorphous regions.

FIG. 1B illustrates an example of a typical dye-based CD-R type media. CD-R discs such as that shown in FIG. 1B typically include a layer of material comprising a light sensitive organic dye 160, deposited on a polycarbonate substrate 164, and coated by a metal reflective layer 166, and a protective layer 168. The metal reflective layer 166 is typically of Gold or Aluminum; the choice of the metal, or alloys of such metals, is a preference of the media manufacturer. Additionally, variations of the layer structure are common, with the addition of other layers between the dye 160 and the reflector 166 layers and/or between the dye 160 and the substrate 164, for optimizing thermal and/or optical characteristics of the disc as demands on the media advance towards faster writing and reading and for increased storage capacity.

Dye such as that which comprises layer 160, changes chemical state when exposed to a write laser. The reflectivity of the dye layer 160 is then read with a read laser having a lower power which does not further change the state of the dye. Suitable dyes generally include organic compounds with conjugated double bonds, and include compounds in the cyanine, squarylium, and azomethine families. Typical, commercially available dye based media are the most frequently used, but other specific types such as Phthalocyanine may be additionally used. With conventional dye based discs, the mark reflectivity toggles between two values in a binary data encoding scheme. The physical length of the mark is typically 0.83 µm for CD-R media and 0.4 µm for DVD-R media.

Other forms of optical discs use materials that are designed to allow multiple write cycles. One such disc uses a layer of material that undergoes a reversible phase change when heated by a write laser. In an optical phase change disc, such regions are formed by irradiating the surface of the disc with a writing laser that causes a region to be warmed and melted or partially melted. As the region cools, the region may change to a crystalline or amorphous state or some combination of crystalline and amorphous states. When a reading laser is incident on such a region, the reflected light can be measured and the state of the region can be determined. The state of the region represents stored data. Different levels of reflectivity may represent different data levels.

Phase change materials that do not support reversible characteristics have also been employed for Write Once Media. The techniques disclosed relating to write once dye based media are also applicable to phase change materials based write once media.

Figure 2B:
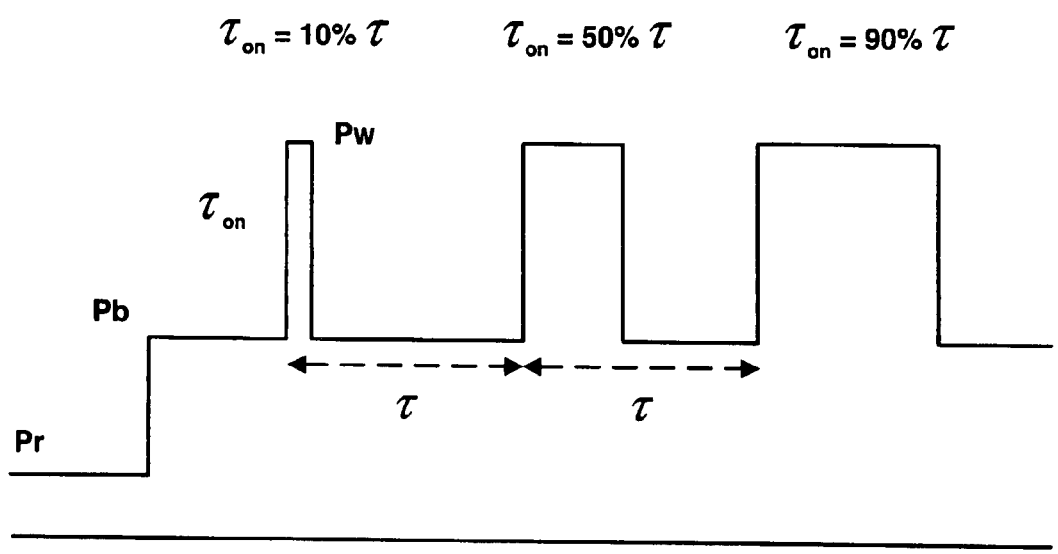

FIGS. 2A and 2B show other embodiments of pulse width modulated write strategies. In FIG. 2A, the duty cycle of the pulse is varied over a period τ. The power level is maintained at the read level, $P_r$, until it is increased to a write level $P_w$ for a duration $\tau_{on}$, which is a percentage of the period τ. While writing to a media using these strategies, several different duty cycles may be used to write desired marks to the track. With dye based media, the different pulse widths control the amount of dye bleaching in the recording layer so as to produce multiple levels of reflectivity. In this embodiment, the level $P_w$ may be held constant while the pulse width duration $\tau_{on}$ changes. In the embodiment of FIG. 2B, a bias power $P_b$ is added to the pulse train to enable the writing of multi-level marks on DVD-R media at higher speeds including, for example, a 14.4 m/sec track velocity. The power level is first increased from $P_r$ to $P_b$ for a time $\tau_b$ until the beginning of a period τ when the power level is increased to $P_w$ for a time $\tau_{on}$. The duty cycle over τ is varied according to the write strategy shown in FIG. 2B. After a time $\tau_{on}$, the power is decreased to $P_b$ for the remainder of τ. In this strategy, the actual powers $P_b$ and $P_w$ and the durations of τ and $\tau_{on}$, will depend on the disc, write speed, and mark size desired. These pulse width modulated methods have been found to be useful with conventional dye-based write once optical recording media, often referred to as CD-R, and DVD-R. They may also be used with write-once phase change media.

Figure 2C:
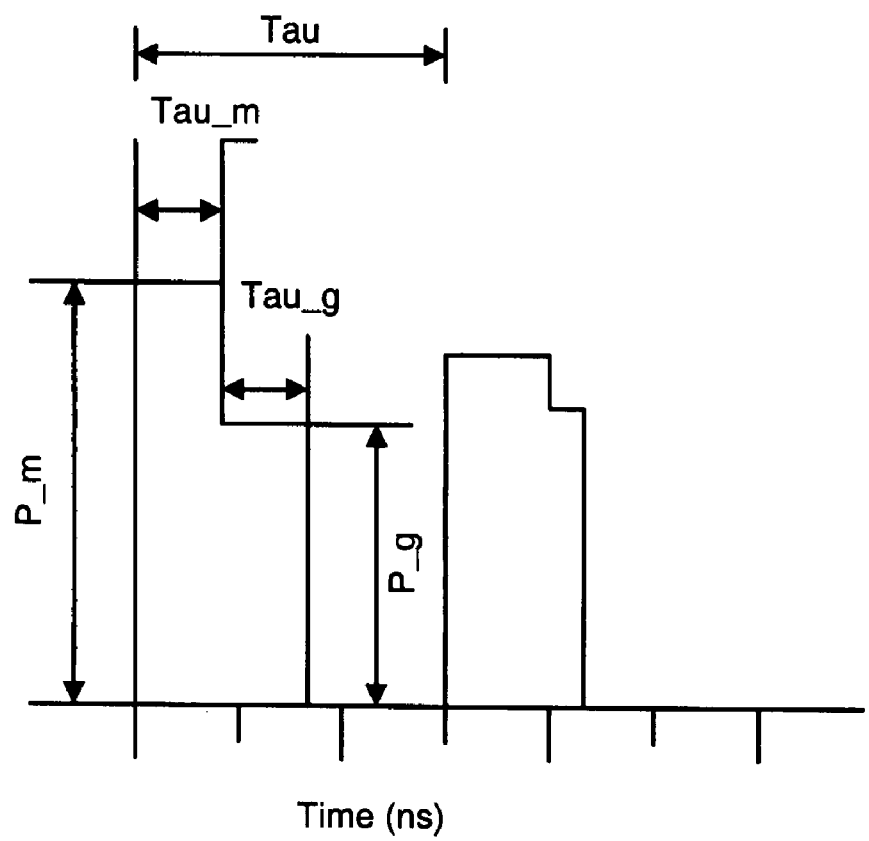
FIG. 2C is a diagram that illustrates a write strategy that uses a pulse having a variable power.

FIG. 2C is a diagram that illustrates a write strategy that uses a pulse having a variable power. The power is varied so that the shape of a mark within a cell is varied. It should be noted that the term cell or data cell as used herein is used simply to refer to a region in which a mark is written and is not meant to imply that a defined cell boundary must necessarily exist or that cells or regions with marks or marks themselves do not overlap. In some embodiments, specific data regions are defined and the position of a mark within the region is controlled. An example of such a strategy is illustrated in FIG. 2C. The pulses are defined by five parameters: Tau, Tau_g, Tau_m, P_g and P_m. In the example shown, the pulse begins with maximum power P_m and continues for a duration Tau_m at maximum power. Then, the pulse transitions to an intermediate power level P_g for a time Tau_g. After interval Tau_g, the pulse ends. As with all of the described write strategies, when the pulse ends, the power may either be zero power or a biasing power. Varying the power during a pulse changes the shape of a mark written by the pulse. In one embodiment, lowering the power in the middle of a pulse decreases the size of the amorphous mark by promoting the growth of crystalline material beginning at the outside boundary of the mark. As is discussed in detail below, marks of different shapes and sizes can be written to produce different reflectivity level signals. This can be accomplished by a suitable choice of Tau_m, Tau_g, $P_m$ and $P_g$ for each level of reflectivity desired.

Figure 2D:
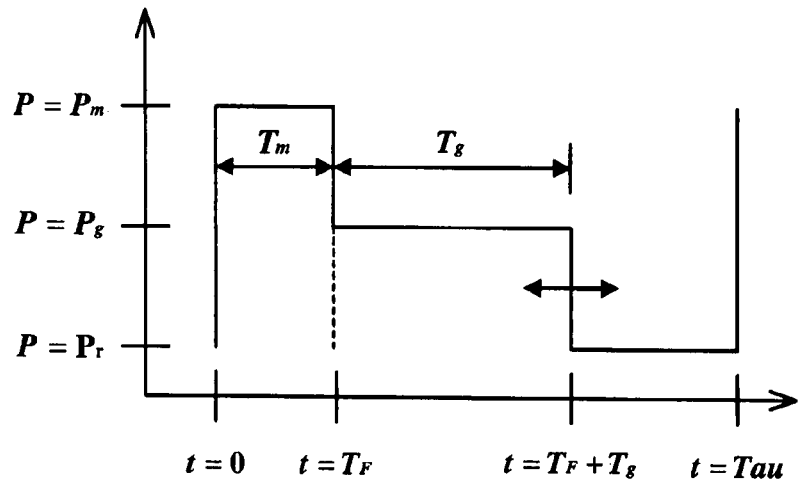
FIG. 2D is a diagram that illustrates a write strategy that uses a pulse having a variable power.

FIG. 2D is a diagram that illustrates a write strategy that uses a pulse having a variable power. This strategy is useful for writing to DVD-RW media at, for example, 3.5 m/s or 7 m/s track linear-velocity. $P_g$ may be varied so that the shape of a mark within a cell is varied. The pulses are defined by several parameters shown and defined in FIG. 2D: Tau, $T_g$, $P_g$, $T_m$, $T_F$, $T_r$, $P_r$, and $P_m$. In the example shown, the pulse begins with a bias power $P_r$, which continues until the beginning of the duty cycle. At t=0, the pulse transitions to a melt power $P_m$, and maintains this level for $T_m$ which in this embodiment is equal to $T_F$. Then, the pulse transitions to an intermediate growth power level $P_g$ for a time $T_g$. After an interval of $t=T_m+T_g$, the pulse ends, transitioning back to the $P_r$ level for the remainder of the period Tau.

The technique of FIG. 2D enables the formation of multi-level marks with DVD-RW, and DVD+RW media, thus enhancing the storage capacity, and performance of these media. The multi-level response from the media is obtained by varying the duration of $T_g$. The melt-power ($P_m$) in this embodiment preferably ranges from 12 to 14 mW, and is immediately followed by a growth power ($P_g$) preferably ranging from about 6 to 9 mW. These parameters will depend on the media used, and the speed at which they are employed. This multi-level write strategy can be used to make marks in the range of 0.2 μm within a data cell size which may be from 0.3 to 0.4 μm. The bias power $P_r$ allows for direct overwriting on written tracks, thus making the strategy useful for DVD+RW, and DVD-RW media types.

Variations may be employed and used for multi-level writing on a number of media types having different characteristics. Multiple levels of reflectivity can be obtained by making marks of different shapes and sizes, by suitable choice of Tau-m, Tau-g, Pm and Pg for the different levels. The dynamics of controlled mark formation depend on the pulse durations, powers and track velocity, besides media thermal characteristics such as conductivity, specific heat, and cooling rate. Higher speeds typically require higher powers to write marks.

Figure 2E:
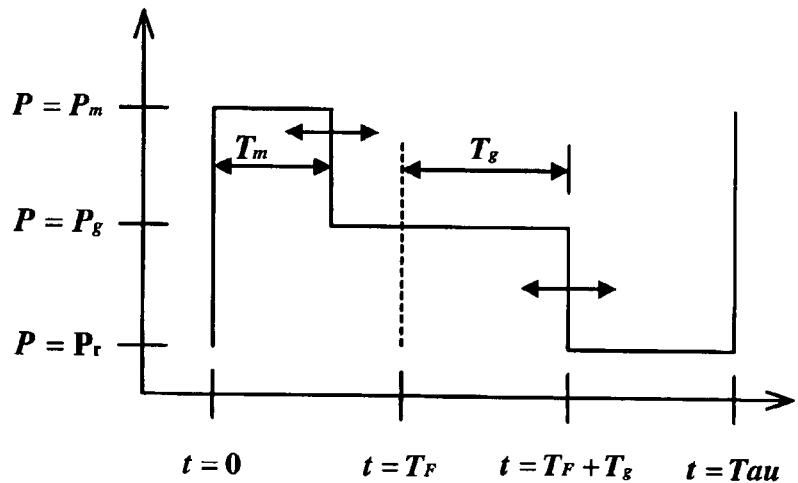
FIG. 2E illustrates a write strategy where the melt period duration $T_m$ is controlled in addition to the location of the transition from growth power $P_g$ back to read power $P_r$.

FIG. 2E illustrates a write strategy where the melt period duration $T_m$ is controlled in addition to the location of the transition from growth power $P_g$ back to read power $P_r$. In this embodiment, for each desired level, the location of the transitions from $P_m$ to $P_g$ and the location of the transition from $P_g$ to $P_r$ are varied for each level, and optimized to maximize dynamic range and minimize noise. In one advantageous embodiment, pulses with a longer growth period $T_g$ have a shorter melt period $T_m$. This may be controlled by the parameter $T_v$, which may vary between 0 and 1. In some embodiments, $T_v$ is optimized globally, and is the same for all levels. It is also possible to have $T_v$ vary for different levels, which provides totally independent control and optimization of both $T_g$ and $T_m$ at all levels. As is demonstrated by the examples below, this technique produces well resolved levels with a low "SDR", wherein SDR for each level is defined as sigma (the standard deviation in reflectivity value across a large number of same level marks) divided by the dynamic range (the reflectivity distance between the most reflective and least reflective levels).

The strategies embodied in FIGS. 2D and 2E allow controlled formation of a crystalline region. The disc material is first melted by the melt power and then cooling is slowed by the growth power to allow formation of a crystalline region. As the melt power period is increased, the amount of crystalline region increases. When the growth power is turned off at the end of the growth period, the disc material cools more rapidly and an amorphous region forms. Thus, the timing and period of the growth period controls the reflectivity of the disc.

In addition to varying the timing of the transition from melt power to growth power and the length of the growth period, the entire waveform including the melt period and the growth period may be shifted in time in relation to previous and future pulses. The shift may be a function of the mark being written or the shift may be a function of a group of adjacent marks.

Figure 2F:
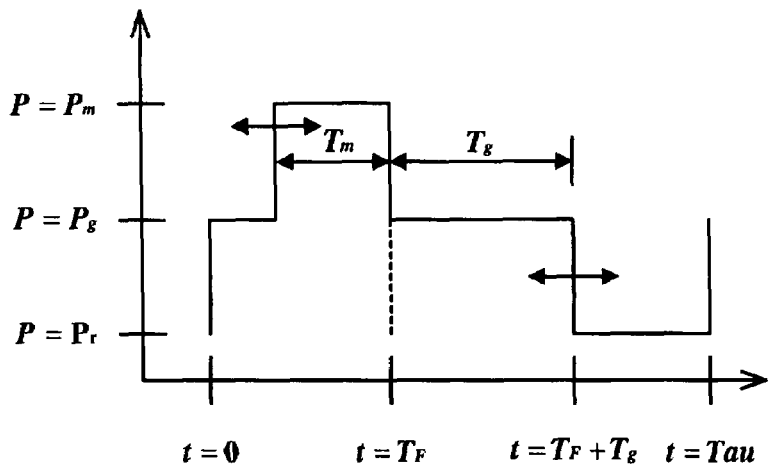
FIG. 2F illustrates a write strategy where a premelt period at the growth power precedes the melt period and the growth period.

FIG. 2F illustrates a write strategy where a premelt period at the growth power precedes the melt period and the growth period. The beginning of the transition from $P_m$ to $P_g$ is fixed at $t=T_F$, and the location of the leading melt pulse transition from $P_g$ to $P_m$ is altered in combination with the location of the transition from $P_g$ back to $P_r$ to produce the multi-level marks. One advantage of including a premelt period is that the material to be melted is heated in preparation for melting, but the lower power delivered during the premelt period does not interfere with the cooling of adjacent material where a previous mark was written. If full melt power is applied at the start of a data cell, heat from the cell tends to conduct to adjacent cell and interfere with the write process for an adjacent mark. In the embodiment shown, the timing of the transition to the melt period is varied according to the mark being written. In other embodiments, the transition to the melt period is fixed.

Figure 2G:
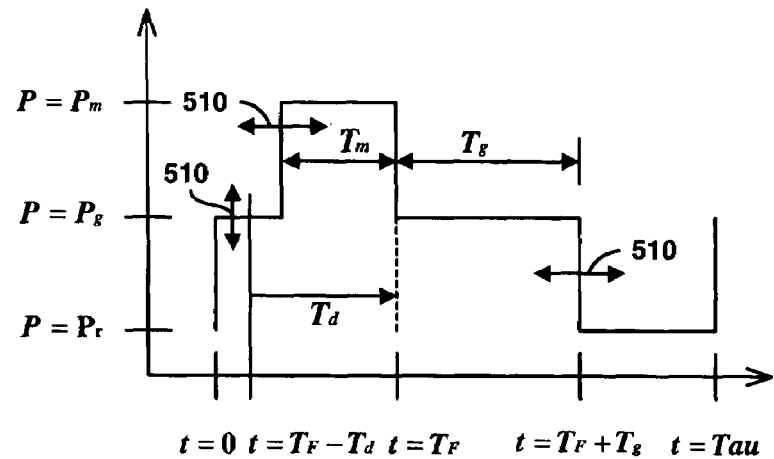
FIG. 2G is a diagram of a write strategy that includes a premelt period that has a variable premelt power and a variable transition time to melt power.

FIG. 2G is a diagram of a write strategy that includes a premelt period that has a variable premelt power and a variable transition time to melt power. This strategy is especially useful because controlling the premelt power as well as the time transition between the premelt power and the melt power further enables interference with the formation of a previous mark to be avoided while still achieving the required heating of the disc material for formation of the current mark. In the embodiment shown, a delay of period $T_F$-$T_d$ is imposed prior to the start of the melt pulse. The premelt power applied during the premelt period helps to erase prewritten marks and improve overwrite performance without interfering with adjacent mark formation. The period $T_d$ and the power level during the delay period $T_F$-$T_d$ are both chosen to optimize performance for specific media. The premelt period may be determined empirically. In one embodiment, the period length and power levels are calibrated based on a signal read from the disc. As is illustrated by arrows 510, the premelt power, the timing of the premelt to melt transition, and the timing of the ending of the growth period are all adjusted according to the mark or group of marks being written. In certain embodiments, one or more of these parameters may be fixed as appropriate for a given system.

Figure 2H:
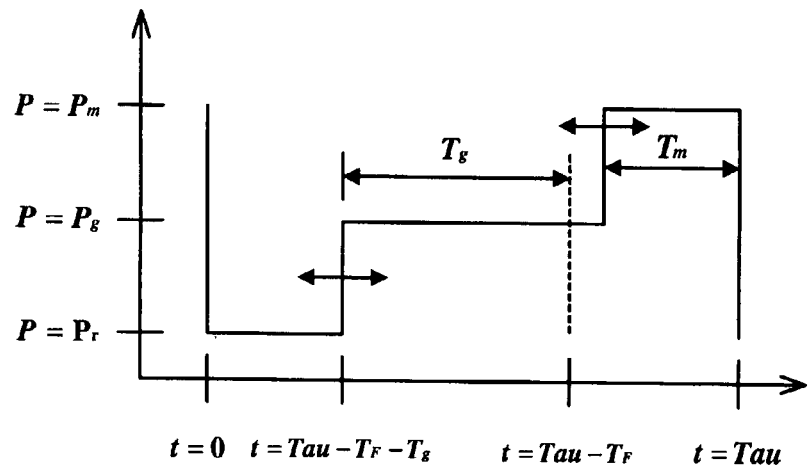
FIG. 2H illustrates a write strategy that uses a progressively increasing power over three periods.
Figure 21:
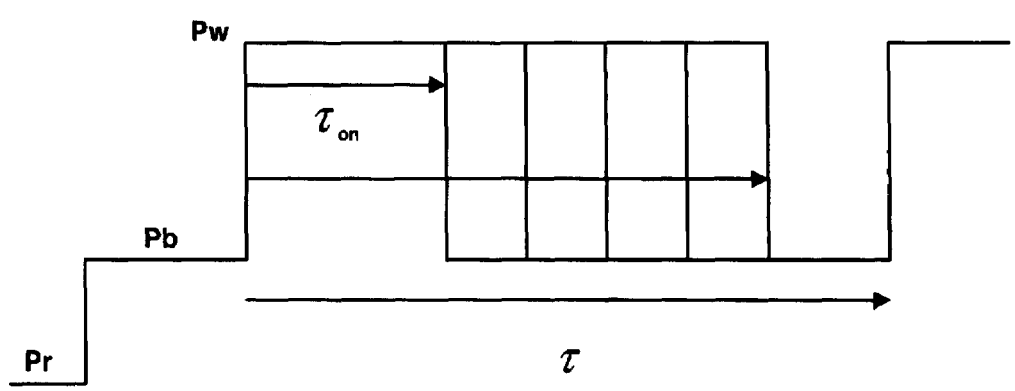

FIG. 2H illustrates a write strategy that uses a progressively increasing power over three periods. The timing of the transitions between the period is varied according to the mark that is being written. The placement within the full mark period, Tau, of transitions from $P_r$ to $P_g$ and from $P_g$ to $P_m$ are controlled to produce the best SDR over all levels. It should be noted that while the variables $P_r$, $P_g$ and $P_m$ are still used to denote power levels, those power levels do not necessarily correspond to read, growth and melt powers. For example, this write strategy is applied to write once die based or phase change media where the power delivered tends to darken more of the media and the process of full melting and partial recrystallization is not relevant.

FIG. 2I shows a write strategy used in a multilevel system that is physically compatible with a DVD-RAM system and media. A bias power $P_b$ is added to a train of pulses to enable the writing of multi-level marks on DVD-RAM media. The power level is first increased from $P_r$ to $P_b$ for a time $\tau_b$ until the beginning of a period $\tau$ when the power level is increased to $P_w$ for a time $\tau_{on}$. The duty cycle over $\tau$ is varied to deliver a variable amount of power. After a time $\tau_{on}$, the power is decreased to $P_b$ for the remainder of the period $\tau$. In this strategy, the actual powers $P_b$ and $P_w$ and the durations of $\tau$ and $\tau_{on}$, will depend on the disc, write speed, and mark size desired. This strategy is useful for writing to DVD-RAM media at, for example, 3.84 m/s track linear-velocity. The technique of FIG. 2I enables the creation of multi-level marks with DVD-RAM media, thus enhancing the storage capacity, and performance of these media. The multi-level response from the media is obtained by varying $\tau_{on}$.

Figure 2J:
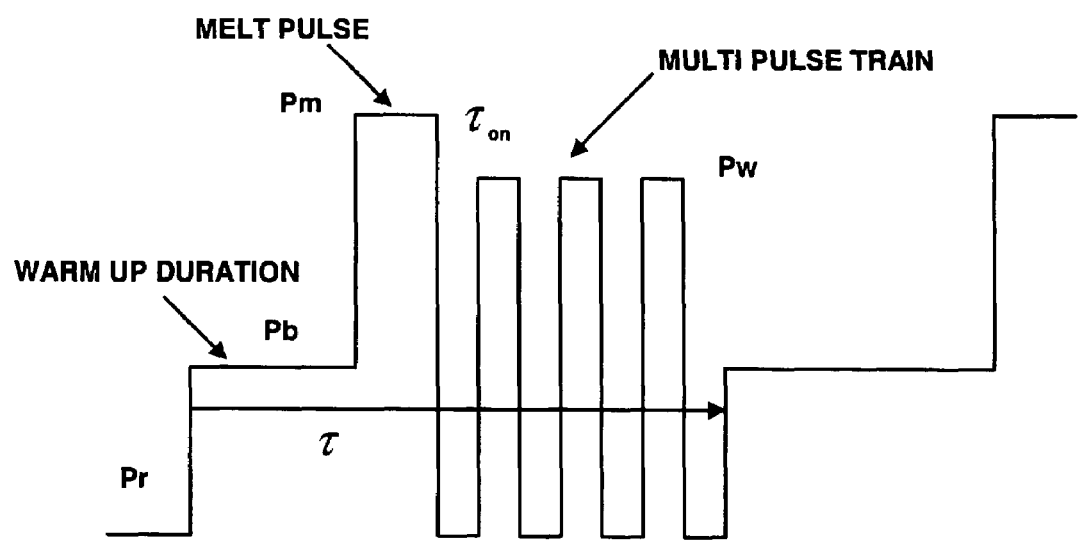
FIG. 2J illustrates a write strategy used to create multilevel marks. The strategy may be used, for example, DVD-RAM media, and has the benefit of reliable disc over-write (DOW) performance.

FIG. 2J illustrates a write strategy used to create multi-level marks. The strategy may be used, for example, DVD-RAM media, and has the benefit of reliable disc over-write (DOW) performance. The strategy is characterized by seven parameters: $\tau$, $\tau_{on}$, $P_w$, $P_m$, $P_b$, $\tau_b$ and $P_r$. In the example shown, the pulse begins at $P_r$. At the beginning of period τ, the power of the pulse is increased to $P_b$, for a duration $τ_b$, at the end of which time the power is increased to $P_m$. The power of the pulse is held at $P_m$ for a duration $τ_{on}$, after which the power is dropped to the $P_r$ level. The combined period at $P_m$ and $P_b$ comprise a melt period. A subsequent series of pulses is then formed with a short duty cycle, and power alternating from $P_w$ to $P_r$; this series of pulses continues for the remaining time in τ, at the end of which the power level is returned to $P_b$.

In the strategy of FIG. 2J, τ determines the length of the data cell in which the marks are written. The warm up duration at the chosen bias power $P_b$ combined with the melt pulse ensure that previously written marks within the data cell, and on the media, are erased completely during the writing of the new mark. The melt pulse creates a molten region of the media which upon quenching leaves an amorphous mark. This process ensures reliable direct over writing during amorphous mark formation for multi-level recording. Amorphous marks can be written inside the data cell during the multi-pulse train which continues to heat the material. The size of the amorphous mark, and therefore the level of reflectivity of the region, is determined by the pulse durations, power levels, and number of pulses within the multi-pulse train. In the embodiment shown, there are two power steps before the pulse train, the warm up at bias power and the melt pulse. In other embodiments, additional power levels are used in additional steps are introduced before the pulse train. These steps comprise subperiods of the melt period.

Advanced data write strategies have been disclosed. The strategies may be applied to control the writing laser in any appropriate optical disc system. Data to be written to a disc is input to a write strategy processor that generates a laser control signal that causes the writing laser to output the appropriate pulses according to the write strategy.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of writing a mark to an optical disc comprising:
    receiving data to be written;
    generating a control parameter having a value within a range from about zero to about one; and
    generating a control signal for a laser pulse having a predefined period comprising a delay period, a melt period and a growth period, wherein the delay period begins with a transition from a read power to a premelt power, the melt period comprises a transition from the premelt power to a melt power configured to melt a region of the optical disc, the growth period begins with a transition from the melt power to a growth power configured to allow formation of crystalline material, includes a transition from the growth power to the read power and ends with an end of the predefined period, and wherein the premelt power, a a position of the transition from the premelt power to the melt power and a position of the transition from the growth power to the read power are adjusted based upon the data to be written and control parameter, wherein a duty cycle of the melt period and a duty cycle of the growth period are adjusted with respect to each other according to said control parameter.

2. A method of writing a mark to an optical disc as recited in claim 1, wherein the duration of the growth power causes the formation of crystalline material.

3. A method of writing a mark to an optical disc as recited in claim 1, wherein the premelt power is lower than the melt power.

4. A method of writing a mark to an optical disc as recited in claim 1, wherein a position of the transition from the premelt power to the melt power within the melt period is varied based on the data to be written.

5. A method of writing a mark to an optical disc as recited in claim 1, wherein a position of the transition from the premelt power to the melt power within the melt period is varied according to the mark being written.

6. A method of writing a mark to an optical disc as recited in claim 1, wherein a position of the transition from the premelt power to the melt power is varied according to a previously written mark.

7. A method of writing a mark to an optical disc as recited in claim 1, wherein a position of the transition between the melt power and the growth power is fixed within the predefined period of the laser pulse.

8. A method of writing a mark to an optical disc as recited in claim 1, wherein the premelt power is varied according to the mark being written.

9. A method of writing a mark to an optical disc as recited in claim 1, wherein the premelt power is varied according to a previously written mark.

10. A method of writing a mark to an optical disc as recited in claim 1, wherein the position of the transition from the growth power to the read power is shifted in time with respect to the end of the predefined period of the laser pulse according to the mark being written.

11. A write strategy control signal generator comprising:
    an input for receiving data to be written to an optical disc;
    a processor configured to generate (i) a control parameter having a value within the range from about zero to about one and (ii) a control signal to control a laser pulse having a predefined period comprising a delay period, a melt period and a growth period, wherein the delay period begins with a transition from a read power to a premelt power, the melt period comprises a transition from the premelt power to a melt power configured to melt a region of the optical disc, the growth period begins with a transition from the melt power to a growth power configured to allow formation of crystalline material, includes a transition from the growth power to the read power and ends with an end of the predefined period, and wherein the premelt power, a position of the transition from the premelt power to the melt power and a position of the transition from the growth power to the read power are adjusted based upon the data to be written and control parameter, wherein a duty cycle of the melt period and a duty cycle of the growth period are adjusted with respect to each other according to said control parameter.

12. The method according to claim 1, further comprising the step of:
    controlling the premelt power and a time of the transition between the premelt power and the melt power to avoid interference with a previous mark.

13. The method according to claim 1, further comprising the step of:
    calibrating a duration of the delay period based on a signal read from said optical disc.

14. The method according to claim 1, further comprising the step of:
    calibrating the premelt power level based on a signal read from said optical disc.

15. The write strategy control signal generator according to claim 11, wherein said processor is further configured to control said premelt power and a time of the transition from the premelt power to the melt power to avoid interference with a previous mark.

16. The write strategy control signal generator according to claim 11, wherein said processor is further configured to calibrate the duration of said delay period based on a signal read from said optical disc.

17. The write strategy control signal generator according to claim 11, wherein said processor is further configured to calibrate a level of said premelt power based on a signal read from said optical disc.

18. The write strategy control signal generator according to claim 11, wherein said processor is further configured to adjust a level of the premelt power, the timing of the transition from the premelt power to the melt power and the timing of the transition ending the growth period based on a group of marks being written.

19. The write strategy control signal generator according to claim 11, wherein said processor is further configured to select a premelt power level and a duration of said growth period based on media of said optical disc.

20. The write strategy control signal generator according to claim 11, wherein said processor is further configured to determine a premelt power level and the duration of the melt power based on a signal read from said optical disc.

21. The method according to claim 1, further comprising varying said value of said control parameter within said range according to a level of reflectivity to be obtained for said mark.

* * * * *